Figure 3:
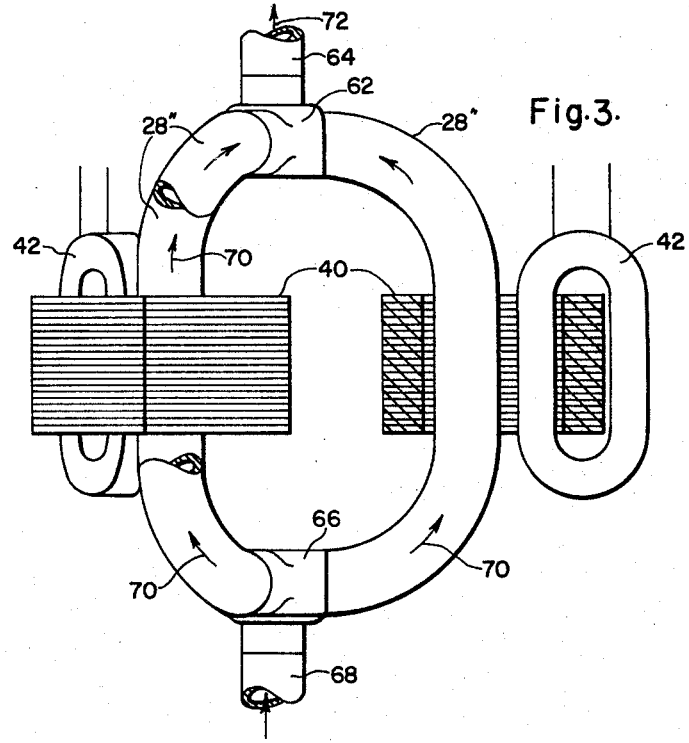

June 11, 1968    R. C. CUNNINGHAM ET AL    3,388,230
INDUCTIONALLY HEATED VAPOR GENERATORS AND OTHER FLUID SYSTEMS
Filed Feb. 23, 1964    3 Sheets-Sheet 1
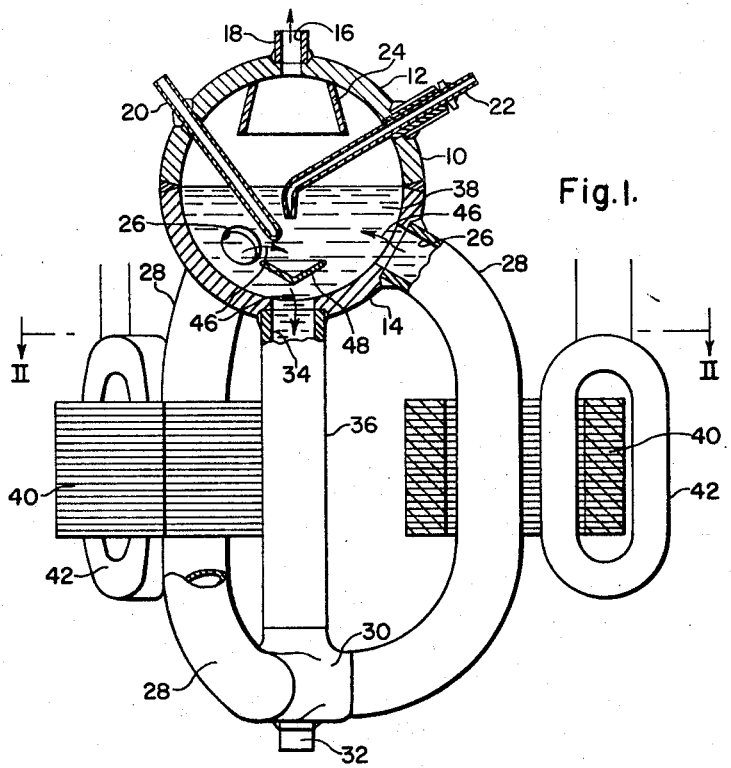
Fig.1.
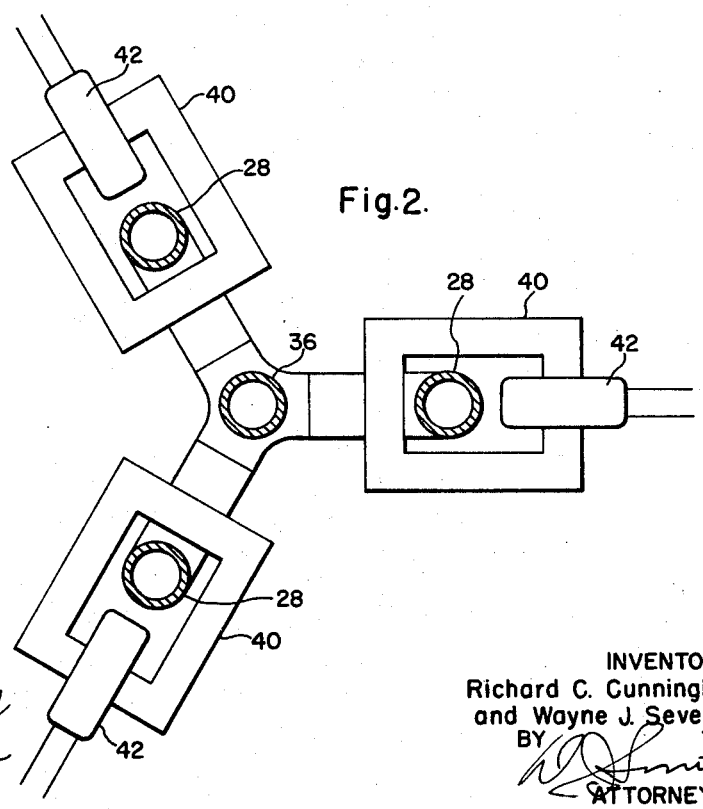
Fig.2.
WITNESSES
Theodore F. Wrobel
Leon M. Garman
INVENTORS
Richard C. Cunningham
and Wayne J. Severson
BY 
ATTORNEY United States Patent Office 3,388,230
Patented June 11, 1968

3,388,230
INDUCTIONALLY HEATED VAPOR GENERATORS AND OTHER FLUID SYSTEMS
Richard C. Cunningham and Wayne J. Severson, Pleasant Hills, Pa., assignors to Westinghouse Electric Corporation, Pittsburgh, Pa., a corporation of Pennsylvania
Filed Feb. 28, 1964, Ser. No. 348,098
8 Claims. (Cl. 219—10.51)

The instant invention relates to induction heating apparatus useful for heating any type of fluid or fluidized material and especially useful for generating a vapor from its corresponding solid or liquid. In particular, the induction heating apparatus is adapted for vaporizing extremely high boiling liquids such as liquid metals and for use with other high-temperature fluid systems.

Presently there is a considerable need for convenient and efficient apparatus for vaporizing liquids maintained at elevated temperatures due to their correspondingly high boiling points and for injecting heat at elevated temperatures into closed systems containing such high temperature liquids or vapors in an efficient manner. Applications of such fluid systems or vapor generators are found in power generating systems such as high temperature nuclear reactors in which liquid metals are employed as coolants. Other applications are found in the production of purification of liquid metals or other high boiling liquids in order to maintain the same in a liquid state for conveyance through suitable conduits to various locations with the manufacturing plant. Still other applications involve similar high temperature fluid systems for melting or thawing the material contained in auxiliary items of equipment such as pumps employed in such systems. Other applications are encountered in basic scientific and engineering studies concerning flow and other characteristics of extremely high temperature liquids and their vapors.

Previous means or methods for supplying heat to the elevated temperature systems described above have proven to be unsatisfactory for a number of reasons. The conduits or vessels or other components of such systems must be provided with very thick walls due to the fact that they are invariably operated at their upper structural limits, thermally speaking, where the rupture strength is very low. With the heat being customarily applied to the exterior surfaces of the vessel or conduit walls the temperature drop due to the extreme wall thickness and the inner and outer film coefficients is very substantial and results in the wall temperatures being very much higher than that of the high temperature fluid contained therein. At such temperatures, the corrosion resistance of known containment materials breaks down rather rapidly in addition to the introduction of very low rupture strength. In the case of fuel fired heaters for such systems one encounters the additional disadvantages of poor control over the quantity of heat introduced into the high temperature system and lack of uniformity in heating which poses the additional threat of hot spots in the system, requiring overdesign for the necessary safety factors. In addition the presence of the hot combustion gases decreases still more rapidly the corrosion resistance of the containment structure of the system. In such cases all of the heat from the fuel-fired heater must be transferred through the containment walls with resulting temperature-drops due to the extreme wall thickness and to the presence of films at the inner and outer wall surfaces.

Ordinary electric heating such as radiant heating or resistance heating apparatus likewise have disadvantages. In the case of radiant heating all of the transferred heat must pass through the entire wall structure and the associated films as noted above. In addition electric heating elements are required which are unsatisfactory in operation due to the extremely high temperature conditions. Direct resistance heating requires power lead connections directly to the containment of the system, and such connections are similarly unreliable at the extreme temperature condition encountered in many applications.

Known forms of electro-magnetic induction heating minimize some of the problem outlined above but, on the other hand, introduce the additional disadvantages of low efficiency and the high cost of a high frequency power supply. Conventional conduction heating apparatus requires conversion of the normal 60 cycle line frequency to a power supply operable at 960 cycles or above. This requirement introduces the necessity of providing expensive rotating frequency converters.

In view of the foregoing an object of the invention is the provision of novel and efficient induction heating apparatus.

Another object of the invention is the adaptation of the aforementioned induction heating apparatus for use in connection with high-temperature vapor-generating apparatus. More specifically it is an object of the invention to characterize such induction heating and vapor generating apparatus for use with various liquid metals and the like maintained at elevated temperatures.

A further object of the invention is the provision of novel induction heating apparatus arranged to add heat directly to a closed fluid system wherein the apparatus promotes natural circulation flow therethrough.

Still another object of the invention is the provision of a direct-heating induction apparatus adapted for use with a multi-phase power supply.

In accordance with the teachings of the present invention, the novel forms of induction heating apparatus are associated closely with the containment of the fluid system to which heat is to be supplied. Thus, the containment, or certain portions thereof is arranged so as to form in addition the secondary circuit of the transformer provided for inductional heating purposes. More specifically, certain containment means or conduits associated with the closed fluid system are arranged to form a short-circuited winding or windings on the secondary side of the inductional heating transformer.

With this arrangement, the induced heat is generated directly within the wall structure of the fluid system, and in the case of systems containing liquid metals or metals or the like to be liquefied heat is also generated directly within the material. This arrangement promotes uniform heating of the containment structure so as to eliminate hot spots and also bypasses the external surface film of the system containment. In the case of systems containing metallic materials the inner surface film of the containment structure is partially bypassed inasmuch as a substantial portion of the heat is induced directly within the metallic material.

In this arrangement of the invention heat is supplied to a plurality of short-circuited conduit loops of the vapor generator or other closed fluid system through the use of an appropriately sized polyphase-connected transformer. The aforementioned loops are arranged to serve as electrically short-circuited windings respectively of the transformer core structures thus connected. The short-circuited loops are arranged in communicative fashion so that the fluid to be heated can flow in series therethrough or through suitably coupled blanched fittings so that the fluid flows in parallel through the short-circuited loops. Vapor collecting means in one arrangement of the invention is associated with the short-circuited loops to collect the vapor generated from the material being boiled therein.

Figure 4:
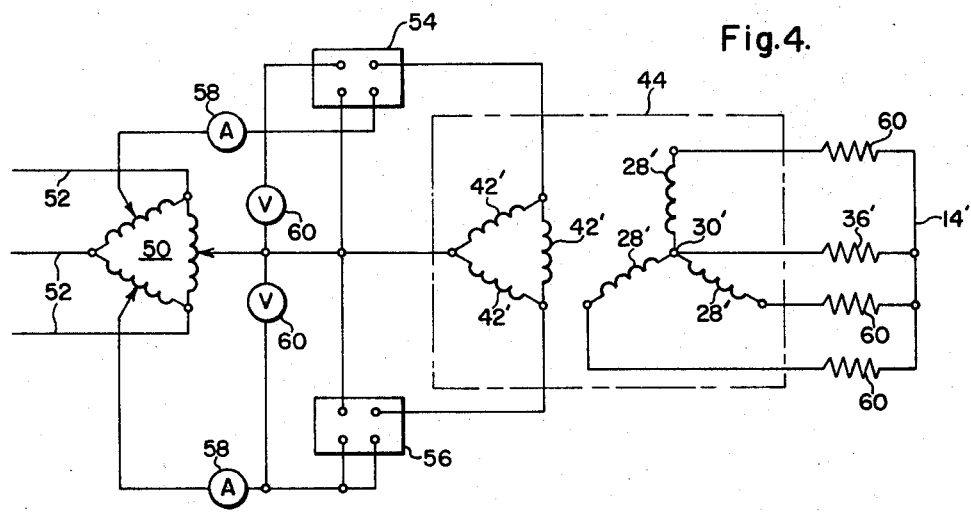
Figure 5:
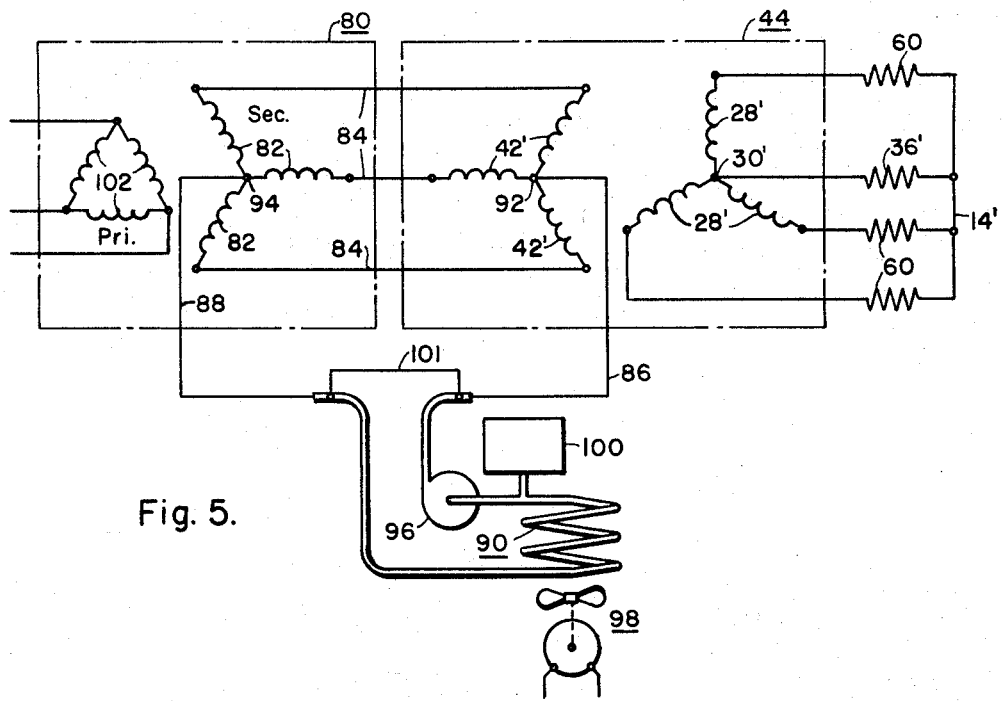

These and other objects, features and advantages of the invention will be elaborated upon during the forthcoming description of the invention, when taken in conjunction with the accompanying drawings wherein:

FIGURE 1 is an elevational view, partially in longitudinal section, of one form of inductional vapor generator construction in accordance with the teachings of the present invention, FIG. 2 is a cross sectional view of the vapor generator illustrated in FIGURE 1 and taken along reference line II—II thereof, FIG. 3 is an elevational view of another form of the inductional heating apparatus arranged in accordance with the invention, FIG. 4 is a schematic representation of the electric circuits associated with the inductional heating apparatus of either FIGURES 1 and 3 herein, and FIG. 5 is a schematic representation of another electrical circuit arrangement for use with the inductional heating apparatus of either FIGURES 1 and 3 herein.

Referring now more particularly to FIGS. 1 and 2 of the drawings, the vapor generating apparatus illustrated therein includes an exemplary spheroidal vapor drum 10 formed from welded hemispheroidal portions 12 and 14. The upper hemispheroidal portion 12 is provided with an exit vapor opening 16 to which is fitted an outlet vapor conduit 18, a portion of which is illustrated in FIG. 1 of the drawings. In addition, the upper hemispheroidal portion 12 includes penetrations into which are inserted respectively a well member 20 for a liquid level indicator and a boiler feed conduit 22 for supplying a quantity of the liquid material initially to the vapor generator and for make-up purposes. Also affixed to the upper hemispheroidal portion 12 is a vapor-liquid separator denoted generally by the reference character 24.

The lower hemispheroidal portion 14, in this arrangement, includes three openings 26 (spaced approximately 120° apart) to accommodate the upper ends of the three heating legs or riser conduits 28. The lower ends of the heating legs 28 adjoin in communication with a four-way fitting 30 to the bottom of which is affixed a drain conduit 32. The four-way fitting 30 is equipped with a fourth outlet 32 in its upper surface which is aligned with a central opening 34 in the lower-most central portion of the lower hemispheroidal portion 14. A return leg or a downcomer conduit 36 is joined at its ends respectively to the fitting outlet 32 and to the lower hemisperoidal portion 14 at its central outlet 34.

With this arrangement each heating leg or circulating loop 28 forms a closed circulating loop for boiling and fluid-circulating purposes with the lower or liquid area 38 of the steam drum 12, the downcomer conduit 36 and the four-way fitting 30. Inasmuch as the vapor generator is fabricated from metallic or conductive structural material each riser conduit 28 in addition forms a complete, electrically short-circuited secondary path with the downcomer conduit 36 and other components of the aforementioned closed loop. In this arrangement, then, there are three such short-circuited electrical paths, although obviously other numerical arrangements can be employed depending upon the character of the polyphasal power supply.

In order to apply inductional heating to the riser conduits 28 a ployphasal transformer including like number of transformer core structures 40 surounding portions respectively of the riser conduits 28, is provided as better shown in FIG. 2 of the drawings. The polyphasal transformer construction is completed by the addition of primary windings 42 on the outer or primary sections of the transformer cores 40 respectively. This arrangement of transformer cores 40, primary windings 42, and short-circuited conduit-windings 28 complete, in this example, a three-phase transformer denoted generally by the reference character 44 in FIGURE 4 and described hereinafter in greater detail.

It will be appreciated of course that polyphase transformers and power supplies of other than three phase can be utilized if desired or where available. In this case the number of the riser conduits 28 will be changed in order to conform to the number of phases characterizing the polyphasal power supply.

In the operation of the invention according to FIGURE 1, electric power applied to the primary windings 42 induces heat in the short-circuited conduit paths 28–30–14 of the vapor generator, which constitute the secondary winding of the polyphasal transformer 44. As demonstrated hereinafter in connection with FIGURE 4 little or no heating effect is produced in the downcomer conduit 36 inasmuch as the current flow therethrough is essentially zero. Adaquate power is supplied thusly to each of the heating legs or riser conduits 28 to cause the liquid material to boil. The difference in density of the two-phase (fluid) flow in the riser conduits 28 relative to the downcomer conduit 36 supplies the necessary head for natural circulation of the liquid when so heated downwardly through the downcomer conduit 36 and upwardly and parallel flows through the riser conduits 28, is denoted by flow arrows 46. The void or vapor fraction in the riser conduits 28 will determine the re-circulation rate in the liquid portion of the vapor generator. An increase in the boiling rate with an attendant increase in the void fraction will in turn increase the re-circulation rate which has the effect of reducing the boiling rate. Thus, the vapor generator exhibits an inherent stabilizing characteristic. A baffle 48 is placed adjacent the entrance to the downcomer conduit 36 in order to inhibit vortex formation and thus prevent vapor from being carried downwardly into the downcomer conduit.

With this arrangement the induced heat is generated directly within the wall structure of the vapor generator or other closed system, so that all of the heat need not be applied to the outer surface of the wall structures, as in conventional heating arrangements. Thus, the temperature gradient through the wall structures is less steep. Where the vapor generator is employed for vaporizing metallic material the temperature drop through the conduit walls is further minimized since about one third of the total induced heat is generated within the liquid metal. However, in no case must heat be conducted entirely through the entire conduit wall.

Referring now to FIG. 4 of the drawings, additional electrical and operational characteristics of the vapor generator will be described. The primary windings 42' are connected, in this example, in a delta network and are supplied from a three-phase variac arrangement 50 which in turn is connected to a suitable source of three-phase potential through leads 52. Suitably connected between the three-phase variac 50 and the primary windings 42' are a pair of wattmeters 54 and 56 for measuring the power dissipation in the polyphasal transformer 44. If desired, a pair of ammeters 58 and voltmeters 60 can be coupled in the primary circuit for the usual purposes.

On the other hand, the short-circuited secondary "windings" are coupled into a star or Y network with the common terminal 30' corresponding to the electrically conductive four-way fitting 30 (FIG. 1). The outer ends of the conduit-"windings" 28' are coupled through resistors 60 representative of the individual ohmic resistances of the riser conduits 28 (FIG. 1), to a common conductor 14' representing the electrically conductive lower hemispheroidal portion 14 of the vapor drum 10. The conductor and resistor denoted generally by the reference character 36' corresponds to the downcomer conduit 36 of FIG. 1 but has little or no electrical effect in the secondary circuit inasmuch as the current therethrough is essentially zero. This follows from well-known electrical considerations due to the fact that the individual components or conduit windings 28' of the secondary star network are connected essentially in bucking relation. Thus the "load" on the polyphase transformer 44 is the total power dissipation in the short-circuited secondary windings 28', which are representative of the riser conduits 28 illustrated in FIG. 1. Moreover, in this arrangement the usual secondary winding losses also become part of the load, since any such losses are dissipated as heat in walls of the secondary conduit windings 28' and therefore is absorbed by the system being heated in the same manner as the inductional heating effects. Thus the inductional heating arrangement of the invention is very efficient, with the percentage efficiency being in excess of 95%.

In FIG. 5 of the drawings, the advantageous use of a coupling transformer 80 is illustrated schematically for the purpose of physically and electrically isolating the primary windings of the load transformer 44 for cooling purposes. Secondary windings 82 of the coupling transformer 80 and the primary windings 42' of the load transformer 44 are formed from a tubular material through which a suitable coolant such as liquid metal is circulated. It will be apparent, however, that other coolants, such as water can be so circulated. In the latter case, of course, it is essential that the tubular windings 42' and 82 be fabricated from an electrically conductive material.

The windings 42' and 82 are connected, in this example into a polyphasal Y network through tubular conductors 84. Although a delta network can be employed, it will be seen that the inlet and outlet conduits 86 and 88 of the circulatory system denoted generally at 90 can be coupled more readily to the Y primary-secondary network 42'-82-84 by connecting the inlet and outlet conduits 86 and 88 to the midpoints 92 and 94 respectively of the primary and secondary windings 42' and 82. Thus, the coolant flows in three parallel paths through the tubular conductors 84 and the associated primary and secondary windings under the impetus of a suitable pump 96, where, as here, a closed circulatory system 90 is employed. The system 90 further includes, in this example, air-cooled heat exchanging means denoted generally by the reference character 98. For thermal cycling absorptive purposes an expansion tank 100 desirably is connected to the circulatory system 90. Where safety considerations dictate a grounded shunt strap 101 across the inlet and outlet conduits 86 and 88 can be used.

Primary windings 102 of the coupling transformer 80 are desirably connected, in the manner described above in connection with the primary windings 42' of FIG. 4, to the polyphasal variac 50 and associated circuit components. It will be understood, of course, that the arrangement of either FIG. 4 or FIG. 5 can be adapted to a different number of electrical phases.

Referring now to FIGURE 3 of the drawings the inductional heating apparatus of the invention is arranged for adding heat to closed fluid systems in general, where boiling and separation of vapor from the liquid are not required. In the arrangement of FIGURE 3 the vapor drum 10 is dispensed with, of course, together with the downcomer conduit 36. A second four-way fitting 62 is employed in their stead to couple the upper ends of parallel heating conduits 28", as viewed in FIG. 3, to outlet conduit 64. The lower ends of the heating conduits 28", as viewed in FIG. 3, are connected in a similar manner to a four-way fitting 66 save that the position of the latter is relatively reversed for connection to inlet conduit 68.

The incoming fluid to be heated thus enters the lower four-way fitting 66 through the inlet conduit 68 and then branches into the three heating conduits 28" as denoted by flow arrows 70. At the upper four-way fitting 62 the respective flows from the heating conduits are recombined and are returned to the system associated with the inductional heating apparatus, through the outlet conduit 64 as denoted by flow arrow 72. Each heating conduit 28" is provided with a transformer core structure 40 and primary winding 42 which function in the manner described previously in connection with FIGURE 1 of the drawings.

In operation, the apparatus of FIGURE 3 is similar to that of FIGURE 1 save that the fluid being heated is not re-circulated directly through the individual heating conduits 28" and the downcomer conduit 36 of FIGS. 1 and 2 is not necessary. The inlet and outlet conduits 68 and 64 can be coupled to any suitable closed system to which it is desired to supply heat. The primary and secondary electric circuits are very similar to that described above in connection with FIGURE 4 except for omission of the connector and resistance 36', corresponding to the downcomer conduit 36 of FIGS. 1 and 2. However, the function of the circuit is the same because, as indicated above, there is essentially no current flow through the downcomer conduit 36.

It will be seen from the foregoing that novel and efficient forms of inductional vapor generating and other heating devices are disclosed herein. Irrespective of the kind of closed fluid system with which the inductional heating apparatus is employed, the heat is generated directly in the walls of the containment of the system. Thus, the containment structure can be operated at a lower differential temperature than the balance of the system which is an important consideration in high temperature, high pressure applications. By the same token, the system with which the inductional heating apparatus is employed has a lower "thermal inertia" because of the lower wall temperatures and the absence of separate heating elements. In the case of such systems which handle liquid or vaporous metals or other fluidized conductive materials, these considerations are even more applicable inasmuch as about one third of the total heat generated by the inductional heating apparatus is generated directly in the conductive material, with the balance of course being generated in the containment structure. Finally, with the employment of multi-phase inductional heating, especially in a case of the three-phase network, a balanced load is imposed upon the available power supply system.

The foregoing materials have been presented for purposes of illustrating the invention and are not to be interpreted in a limiting sense. Accordingly, it will be apparent that numerous embodiments of the invention will occur to those skilled in the art without departing from the spirit and scope of the invention. For example, it will be apparent that the invention can be adapted to vapor generators, liquid heaters or vapor heaters for use with any suitable fluid either conducting or non-conducting. In a case of non-conducting fluids, the riser conduits 28 of FIG. 1 or the parallel branched conduits 28" of FIG. 3 would be designed to generate all of the heat required within the tubing walls and would be sized accordingly. For testing purposes or other special applications, the geometry of the riser conduits 28 (FIG. 1) or of the branched conduits 28" (FIG. 3) can be varied from conduit to conduit or within a given conduit as by variations in wall thicknesses to produce controlled "hot spots" or "chills" within the fluid system.

Accordingly, what is claimed is new is:

1. Inductional heating apparatus for use with a closed fluid system, said apparatus comprising a pair of spaced conduit portions coupled to said system, a plurality of parallel conduit members bridging said space and having their ends coupled in communication to a pair of fittings coupled likewise in communication with adjacent ends of said conduit portions respectively, at least said parallel conduits and said fittings being fabricated from an electrically conductive containment material, a polyphasal transformer including core structures encircling said parallel conduit members respectively so that each of said conduits in effect is a short-circuited electrical winding for its associated core structure, a polyphasal primary circuit including windings on each of said core structures, and circuit means for connecting said primary circuit to a source of polyphasal potential, and an unheated downcomer conduit extending between said fittings to promote natural circulation in a recycling path through said conduit members, said fittings and said downcomer conduit.

2. Inductional heating apparatus for use with a vapor generator, said apparatus including an unheated downcomer conduit coupled to a liquid portion of said vapor generator, a plurality of riser conduits having their lower ends coupled in communication to the lower end portion of said downcomer conduit, and having their upper end portions coupled in communication and in parallel with an electrically conductive containment portion of said vapor generator, at least said riser conduits and the lower end portion of said downcomer conduit in addition being fabricated from an electrically conductive containment material, a polyphasal transformer inductively coupled only to said riser conduits so that the latter in effect serve as short-circuited secondary transformer windings for said transformer, and circuit means for connecting said transformer to a source of polyphasal potential.

3. Inductional heating apparatus for use with a vapor generator, said apparatus including an unheated downcomer conduit coupled to a liquid portion of said vapor generator, a plurality of riser conduits having their upper ends coupled in electrical parallel and in communication through an electrically conductive portion of said vapor generator, the lower ends of said riser conduits being joined in communication with the lower end portion of said downcomer conduit, at least said riser conduits and said lower end portion of the downcomer conduit in addition being fabricated from an electrically conductive containment material, a polyphasal transformer including core structures encircling only said riser conduits respectively so that the latter serve as short-circuited secondary windings for said core structures, a polyphasal primary circuit including primary windings on said core structures, and circuit means for connecting said primary circuit to a source of polyphasal potential.

4. An inductionally heated vapor generator comprising a vapor drum having vapor and liquid portions therein, the containment structure of said vapor drum adjacent at least said liquid portion being fabricated from an electrically conductive material, an unheated downcomer conduit having its upper end joined in communication with a lower portion of said vapor drum liquid portion, a plurality of riser conduits joined in communication with a higher portion of said vapor drum liquid portion and having their lower end portions coupled in communication with the lower end portion of said downcomer conduit, said riser conduits and at least the lower end portion of said downcomer conduit in addition being fabricated from an electrically conductive containment material, a polyphasal transformer coupled inductively only to said riser conduits respectively so that the latter in effect are short-circuited secondary windings for said transformer, and circuit means for connecting said transformer to a source of polyphasal potential.

5. An inductionally heated vapor generator comprising a vapor drum having an upper vapor area and a lower liquid area, an outlet conduit communicating with said vapor area for coupling said generator to an external vapor utilizing means, a liquid-vapor separator mounted in said vapor area in communication with said outlet conduit, a boiler feed conduit extending through a wall portion of said vapor drum and having its inner open end disposed below the normal liquid level of said vapor drum, a downcomer conduit coupling the lowest portion of said liquid area to a multi-way fitting disposed generally below said vapor drum, said multi-way fitting having a plurality of outlet openings, a like number of riser conduits having their lower ends coupled in communication with said fitting through said openings respectively and having their upper ends coupled in communication with the liquid area of said vapor drum at positions generally above said upper riser conduit end, said fitting and said riser conduits and at least the wall structure of said vapor drum adjacent said liquid area being fabricated from an electrically conductive containment material, a polyphasal transformer including core structures encircling said riser conduits respectively so that said riser conduits serve as short-circuited secondary transformer windings for said polyphasal transformer, a polyphase-connected primary circuit including primary windings on said core structures respectively, and circuit means for connecting said primary circuit to a source of polyphasal potential.

6. Inductional heating apparatus for use with a closed fluid system, said apparatus comprising a branched conduit network forming part of said system, said conduit network including a plurality of parallel conduit means communicating therewith, at least said conduit means being fabricated from a conductive containment material, means for electrically connecting said conduit means into a short-circuited polyphasal network, said conduit means forming short-circuited secondary transformer conduit-windings when so connected, a polyphasal load transformer having a core structure coupled to said secondary conduit windings, a polyphasal coupling transformer, tubular polyphasal secondary and primary winding system on said core structure and on said coupling transformer respectively, means for circulating a fluidizable coolant material through the interior of said tubular winding system, and supply circuit means for said coupling transformer including primary winding means thereon.

7. Inductional heating apparatus for use with a closed fluid system, said apparatus comprising a branched conduit network forming part of said system, said conduit network including a plurality of parallel conduit means communicating therewith, at least said conduit means being fabricated from a conductive containment material, means for electrically connecting said conduit means into a short-circuited polyphasal network, said conduit means forming short-circuited secondary transformer conduit-windings when so connected, a polyphasal load transformer having a core structure coupled to said secondary conduit windings, a polyphasal coupling transformer, tubular polyphasal secondary and primary winding system on said core structure and on said coupling transformer respectively, the secondary and primary portions of said winding system being coupled respectively into polyphasal Y networks, means coupled to the midpoints respectively of said Y networks for circulating a fluidizable coolant material through the interior of said tubular winding system, and supply circuit means for said coupling transformer including primary winding means thereon.

8. The combination of claim 7 further characterized in that said coolant material is a liquid metal circulated through said winding system.

References Cited
UNITED STATES PATENTS

| | | | |
|---|---|---|---|
| 2,729,731 | 1/1956 | Kleinpeter | 219—10.51 |
| 3,171,009 | 2/1965 | Scheller et al. | 219—10.65 |

FOREIGN PATENTS

| | | |
|---|---|---|
| 61,268 | 8/1943 | Denmark. |
| 627,388 | 2/1936 | Germany. |

RICHARD M. WOOD, *Primary Examiner.*

L. H. BENDER, *Assistant Examiner.*